Patented Aug. 27, 1946

2,406,336

UNITED STATES PATENT OFFICE 2,406,336

WAXES

Laszlo Auer, South Orange, N. J.

No Drawing. Application August 21, 1942,
Serial No. 455,613

10 Claims. (Cl. 106—10)

FIELD OF INVENTION

This invention relates to the modification of the properties of waxes. The invention is particularly concerned with treatment of organic ester-type waxes or waxlike materials, as distinguished from certain hydrocarbons which are sometimes termed waxes. For instance, while paraffin, montan wax and ceresin, are sometimes referred to as waxes, they are not "true" waxes. In contrast, the invention is concerned with the treatment of ester-type waxes such, for instance, as listed just below:

Beeswax
Carnauba wax
Spermaceti wax
Candelilla wax
Japan wax
Bayberry (Myrtle) wax These waxes are esters of long chain aliphatic alcohols with long chain aliphatic fatty acids, as is indicated in the following listing of some of the major constituents of various of the waxes above mentioned.

Beeswax a. Main constituents:
  1. Cerotic acid
  2. Myricyl palmitate
b. Subordinate constituents:
  1. Melissic acid
  2. Myricyl alcohol
  3. Ceryl alcohol
c. 13% hydrocarbon

Carnauba wax a. Carnaubic acid
b. Ceryl, myricyl alcohols
c. Other alcohols
d. A hydroxy acid
e. A hydrocarbon

Spermaceti wax a. Main constituents:
  1. Ceryl palmitate
b. Subordinate constituents:
  1. Glycerides of lauric, stearic, and myristic acids

Candelilla wax a. 56% unsaponifiable (hydrocarbon)
b. Remainder (ester)

Japan wax a. Main constituents:
  1. Palmitin
  2. Palmitic acid
b. Subordinate constituents:
  1. Dibasic acids
  2. Soluble acids

Bayberry wax a. Palmitin
b. Palmitic acid

Although some of the foregoing list are of animal and some of vegetable origin, I believe them all to be organic isocolloids, i. e., colloidal substances in which the dispersed phase and the dispersion medium are both of the same chemical composition, though present in different physical states.

There are other wax or wax-like materials which are organic isocolloids and which may be treated in accordance with the invention; for instance, synthetic wax-like products containing either a natural wax alcohol or a natural wax acid or their homologues, derivatives and substitution products.

The term "ester-type waxes," as used herein, is intended to comprehend not only the natural ester-type waxes, but also synthetic products of the type mentioned just above.

I have found that by dispersing treating or modifying agents in the waxes, changes may be brought about in a number of different characteristics or properties, thereby rendering the treated waxes better suited to many purposes than are the same untreated waxes. The changes or modifications brought about in accordance with the present invention are apparently colloidal and/or chemical in nature, in many instances changes of both types occurring as a result of the treatment. For instance, a change in the relative proportions of the dispersed phase and dispersion medium may be brought about.

Whatever may be the exact mechanism by which the changes occur, I have found that the present invention may be utilized to bring about changes in such physical characteristics as melting point, acid value, saponification value, iodine value, solubility characteristics in various solvents, and physical consistency at various different temperatures.

Modification in certain respects noted above is important for some purposes, and for other purposes, modification is desirable in other respects. Because of common uses of various waxes, for instance, in floor polish, furniture polish, shoe polish, and the like, it is frequently desirable to employ a wax having a relatively high melting point. Although the melting point need not necessarily be changed in all instances, it is of importance that the invention is well suited to the raising of the melting point of waxes, for instance, of beeswax and certain others, which, in their normal condition have a relatively low melting point and therefore have not heretofore been considered as practicable to employ for certain purposes in which a higher melting point (for instance, that of carnauba wax) is preferred.

The foregoing is cited as illustrative of the manner in which the present invention may be utilized to adapt certain waxes to uses for which they are not well suited in their natural state. In this way, in some instances the invention makes possible the utilization of a less expensive wax to replace a more expensive one, without appreciable sacrifice of quality of finished product such, for instance, as floor or furniture polish.

In addition to some of the uses already mentioned, waxes are adaptable for many other purposes among which might be mentioned metal polishes, automobile body polishes, carbon paper and typewriter ribbon impregnating compounds, dental waxes, sealing waxes and ski waxes. A wide variety of properties and characteristics are desired for many of the several commercial uses and the invention, in its broad aspect, has in mind adapting various waxes to the several commercial uses, thereby better fitting them for such purposes.

Before considering in detail the nature of the process and the treating agents employed, the process is first briefly summarized as follows:

The wax to be treated is preferably heated in the presence of the modifying agent for a substantial period of time and at a temperature considerably above normal room temperature, it being of importance to secure thorough dispersion of the treating agent in the wax.

MODIFYING AGENTS

Modifying agents of quite a wide variety of types may be employed. Many of such agents are polar compounds, i. e., compounds containing a positive charge in one part of the molecule and a negative charge in another part of the molecule, or capable of orienting their different radicals in opposite directions on an interface of liquid-gas, solid-gas, liquid-solid or liquid-liquid. Many polar compounds which are electrolytes have been found to be useful.

The modifying agents may be classified in various ways, for instance under the following headings—

Metal salts of inorganic acids
Metal salts of organic acids
Inorganic acids
Organic acids Metallo-organic compounds:
  Metal alcoholates
  Aryl-metal compounds Organic salts of inorganic acids
Inorganic salts of organic bases
Organic esters Amines also constitute a useful class, particularly the poly-amines, for instance, di-amines.

Many of the compounds falling in certain classes mentioned above are also of the type which I have termed "two-radical" compounds, i. e., compounds having within the molecule an acidic inorganic residue and an organic residue. By an acidic inorganic residue I mean a residue capable of yielding an inorganic acid upon the addition of one or more hydrogen atoms, OH groups, or water molecules, or upon the application of heat.

Such two radical type compounds may desirably contain a sulpho-, halo- or nitro-group.

Typical examples of certain of the foregoing classifications are given just below:

Metal salts of inorganic acids:
  Sodium bisulphite
  Sodium hydrosulphite
  Sodium sulphite
  Ammonium iodide
  Magnesium chloride
  Zinc carbonate
  Lead chromate
Metal salts of organic acids:
  Sodium oxalate
  G-salt (sodium beta naphthol-6, 8-disulphonate)
Salts of organic amines:
  Diphenylamine trichloracetate
Inorganic acids:
  Sulphuric acid
  Phosphoric acid
  Hydrochloric acid
Organic acids:
  Tartaric acid
  Maleic acid
  Acetic acid
  Oxalic acid
  Salicylic acid
  Phthalic acid
  Citric acid
Metal alcoholates:
  Sodium amylate
Amines:
  Benzidine base
  a-Naphthylamine
Two-radical compounds:
  Sulphosalicylic acid
  Nitro-anthraquinone
  p-Toluene sulphochloride
  p-Toluene sulphonic acid
  o-Nitrophenol
  p-Nitrophenol I have found certain groups of modifying agents to be particularly effective in the treatment of waxes—for instance, metal salts; amines, particularly diprimary amines; and two radical type compounds, especially those containing sulpho- and nitro-groups.

Hereinafter examples are given of the treatment of waxes with modifying agents selected from various of the classes above discussed.

TREATMENT CONDITIONS

Although the treatment conditions may be varied in accordance with a number of factors such as the particular wax being treated, the treating agent selected and the characteristics desired, in general, the treatment conditions should conform with the following:

With respect to temperature, it is first noted that while some modification may be brought about by dispersing the modifying agent in the wax at normal room temperature, in general, the treatment temperature should be above the melting point of the wax though not above the point at which any appreciable decomposition occurs. Usually it is found that a temperature between about 100° C. and 310° C. is effective. Increase in temperature is usually accompanied by more rapid and/or more extensive modification, although as just noted, the temperature is desirably kept below the point at which any decomposition occurs. Particularly good results are secured with many waxes at temperatures between about 250° C. and 310° C.

The duration of the heating will again depend somewhat on the materials used and the results desired. Usually the heating should be continued at least until thorough dispersion of the treating agent is obtained. Ordinarily it is found that treatment for a period of at least 30 minutes is required for this purpose.

The quantity of modifying agent employed will also depend somewhat on the wax being treated, on the modifying agent selected and on the particular characteristics desired. For various purposes a relatively wide range is suitable, for instance, from an appreciable trace (such as .01%) up to about 30%. Ordinarily, however, a range from .1% to 10% is found to be effective. With many treating agents more than a fractional percentage is required to secure an appreciable modification, although as will appear from certain examples given hereinafter, .5% is shown to be sufficient for some purposes.

The nature of the atmosphere in contact with the reaction mass will influence the modification which occurs. With many waxes and with treatments for a number of purposes, it may be found desirable to exclude air from the reaction. This may be accomplished by employing vacuum, and/or introducing certain gases into the reaction vessel to blanket the surface of the batch. Gases suitable for this purpose are nitrogen, $CO_2$, $SO_2$, $H_2S$, amongst others.

Pressures above atmospheric may also be employed to advantage for some purposes.

In addition to employment of gases for purposes such as mentioned just above, certain gases may also be utilized by bubbling the same through the reaction mass during the treatment, so as to bring about further or supplemental modifications. $SO_2$ and $H_2S$ may be utilized for a purpose such as this. Under certain conditions a sulphurized product may be obtained by combined use of $SO_2$ and $H_2S$.

Since waxes are ordinarily solid or paste-like materials at normal room temperatures, admixture of the wax and modifying agent is, in most cases, desirably accomplished by melting the wax and treating agent together. Obviously, however, from the standpoint of the broader aspects of the invention, the wax and the treating agent may be brought together in any desired manner. Agitation may be useful for this purpose in some instances.

Beyond the foregoing, it is contemplated that the modifying agent may be produced in situ, by introducing materials which will react under the conditions of treatment to produce the modifying agent desired.

EXAMPLES

In a series of comparative experiments, a beeswax was treated with a number of different modifying agents. The initial untreated beeswax had a melting point of 64° C., an acid value of 20.2 and a saponification value of 93.3. The wax was of medium light color.

For purposes of comparison, in one experiment this wax was heated without any modifying agent, under exactly the same conditions as employed for the heating in the following experiments using various different modifying agents. This heated wax had a melting point of 75° C., an acid value of .75, and a saponification value of 100.5. The product was black.

The treatment conditions employed not only for the heating of the wax without modifying agent, as above mentioned, but also in each of the following experiments of this series were as follows:

The wax was placed in an open beaker under a blanket of $CO_2$ and maintained at about 300° C. for a period of five hours.

The following table indicates the modifying agents and percentages thereof used in each of the comparative experiments, and also various of the resulting characteristics:

| Example | Modifying agent | Percent | Melting point °C. | Acid value | Sap. value | Solubility |
|---|---|---|---|---|---|---|
| Untreated | | | 64 | 20.2 | 93.3 | 1 |
| Heated | | | 75 | .75 | 100.5 | 1 |
| 1a | Sodium bisulphite | ½ | 82 | 2.75 | 96.4 | 1+ |
| 1b | do | 5 | 137 | 1.95 | 77.5 | 2+ |
| 2a | Sodium hydrosulphite | ½ | 75 | 1.15 | 89.7 | 1 |
| 2b | do | 5 | 140 | 2.8 | 66.7 | 4+ |
| 3a | Sodium sulphite | ½ | 90 | 1.75 | 79.9 | 1 |
| 4a | Benzidine base | ½ | 75 | 1.98 | 88.1 | 1 |
| 4b | do | 5 | 121 | .7 | 92.4 | 2+ |
| 5a | Nitro-anthraquinone | ½ | 73 | .7 | 91.85 | 1+ |
| 5b | do | 5 | 74 | .7 | 83.2 | 2- |
| 6a | Sulphosalicylic acid | ½ | 76 | .7 | 92.8 | 1 |
| 6b | do | 5 | 75 | .8 | 100.5 | 1 |
| 7a | p-Toluene sulphochloride | ½ | 70 | .3 | 89.7 | 1+ |
| 7b | do | 5 | 68 | 54.5 | 85.5 | 1+ |
| 8a | p-Toluene sulphonic acid | ½ | 75 | 0.8 | 92.6 | 1 |
| 8b | do | 5 | 80 | 2.1 | 74.4 | 3+ |
| 9a | o-Nitrophenol | ½ | 75 | .7 | 100.6 | 1- |
| 9b | do | 5 | 74 | 4.9 | 92.5 | 1 |
| 10a | p-Nitrophenol | ½ | 74 | .8 | 94.6 | 1 |
| 10b | do | 5 | 75 | 4.03 | 85.8 | 1 |

From the above it will be seen that certain classes of treating agents are of especial advantage in raising the melting point of the waxes. Note for instance that a very marked increase in melting point is secured by the use of metal salts (see Examples 1a, 1b, 2a, 2b and 3a) and also by the use of an amine, such as the benzidine base of Examples 4a and 4b, this amine being a di-primary amine.

Analysis of the foregoing table will further show that in many instances the higher percentage of modifying agent produces a greater degree of modification.

The comparative results above also indicate the possibility of securing appreciable changes not only in acid value but also in the saponification value, depending upon the treating agent employed and the percentage used.

The column in the above table under the heading of "Solubility" indicates the consistency of a mixture of the wax with turpentine, in the ratio of 50% wax and 50% turpentine. The numerals in the column represent an arbitrary scale, the higher numerals indicating stiffer wax-turpentine mixtures. For example, numeral 2 indicates a mixture of stiffer consistency than numeral 1. 2+ indicates a still stiffer mixture, and so forth.

Thus, from the "Solubility" column it will be seen that most of the treated waxes yield wax-turpentine mixtures which are at least as stiff as those secured with the untreated wax (and also with the wax which was heated without modifying agent). Many of the modified waxes yielded wax-turpentine mixtures considerably stiffer than the same mixture incorporating the untreated wax; note, especially, the waxes treated with 5% of sodium hydrosulphite and with 5% of p-toluene sulphonic acid.

Although the color of all of the products was darker than the untreated and unheated beeswax, it is interesting to note that the color of certain of the products resulting from use of modifying agents was lighter than the color of the beeswax which had been heated without modifying agent. Thus, the products of Examples 4a, 6a, 6b, 7a, 7b, 8a and 9a were all lighter in color than was the product of the beeswax when cooked without modifying agent.

With respect to the color of the waxes, it is to be noted that for many purposes the color is immaterial. In instances, however, where it is desired to retain as light a color as possible, the modifying agent should be selected accordingly.

In another series of comparative experiments candelilla wax was treated with various modifying agents, the treatment conditions being the same for each example. In this series treatment was effected in a closed beaker (having only a small outlet to the atmosphere), without introduction of any gas and at atmospheric pressure. The temperature was maintained in each case at about 300° C. for five hours. In all experiments of this group 5% of the treating agent was employed.

The initial untreated candelilla wax had a melting point of 73°, an acid value of 16.9, saponification value of 52.5, the initial color being medium light.

For purposes of comparison one batch of the wax was treated under the foregoing conditions but without the presence of any modifying agent. The product of this experiment had a melting point of 74° C., an acid value of 9.9, a saponification value of 48, and the color was medium dark.

The following table indicates the reagent used in the several experiments of this series, and also various characteristics:

Analysis of the foregoing again shows quite surprising results in modification of various properties. Note for instance the exceptional result secured from the standpoint of melting point when employing sodium bisulphite as in Example 11. Sodium hydrosulphite, benzidine base and p-nitrophenol also substantially increased the melting point.

The modifications in color are also significant, it being of interest to note that a number of the products treated with modifying agents had a color lighter than the batch which was heated without any modifying agent. In fact, nitroanthraquinone and p-toluene sulphonic acid of Examples 14 and 17 yielded a product having a color approximating that of the original untreated and unheated candelilla wax.

The above table also shows considerable modification in certain instances in the consistency of wax-turpentine mixtures, this characteristic again being indicated in the "Solubility" column.

Various of the foregoing waxes were incorporated in several different polish formulas in order to secure comparative data as between treated and untreated waxes and also as between the effect of different modifying agents. With this purpose in view the waxes were used in a furniture polish, in a floor polish and in a shoe polish.

*Furniture polish*

A typical furniture polish formula was selected, this being as follows (all parts being by weight):

| | |
|---|---|
| "Replacement ingredient" | 10 |
| Beeswax | 4 |
| Ceresin | 4 |
| Stearic acid | 8 |
| Triethanolamine | 4.8 |
| V. M. & P. naphtha [1] | 80 |
| Water (boiling) | 200 |

[1] Varnish maker's and painter's naphtha.

In formulating the foregoing polish, the several wax ingredients (including stearic acid) were melted in the order listed above, the "replacement ingredient" being different in each polish prepared, i. e., being selected from various of the untreated and treated waxes discussed above. After melting of the waxes together, the triethanolamine was added. Then followed slow addition of the naphtha with agitation. Agitation was continued during very slow addition of the boiling water, until a uniform emulsion was produced, the agitation being continued until the polish had cooled.

The untreated and also the heated (without modifying agent) beeswax and candelilla wax were substituted in place of the "replacement ingredient," in addition to the employment of various of the waxes modified with treating agents. For convenience in the following analysis of re-

| Example | Modifying agent | Melting point | Acid value | Sap. value | Solubility | Color |
|---|---|---|---|---|---|---|
| | | Degrees | | | | |
| Untreated | | 73 | 16.9 | 52.5 | 1 | Light. |
| Heated | | 74 | 9.9 | 48.0 | 1 | Fairly dark. |
| 11 | Sodium bisulphite | 157 | .8 | 16.9 | 3+ | Black. |
| 12 | Sodium hydrosulphite | 97 | Negligible | 22.0 | 1+ | Quite dark. |
| 13 | Benzidine base | 80 | do | 29.3 | 4+ | Black. |
| 14 | Nitroanthraquinone | 74 | do | 25.1 | 1− | Light. |
| 15 | Sulphosalicylic acid | 75 | do | 46.4 | 1 | Fairly dark. |
| 16 | p-Toluene sulphochloride | 73 | do | 39.6 | 1 | Do. |
| 17 | p-Toluene sulphonic acid | 69 | do | 29.1 | 1+ | Quite light. |
| 18 | o-Nitrophenol | 74 | do | 33.1 | 1 | Very dark. |
| 19 | p-Nitrophenol | 89 | do | 40.7 | 1+ | Black. | sults, the beeswax which was used in untreated condition and the beeswax which was heated without modifying agent are referred to, respectively as beeswax controls A and B. The candelilla wax (untreated, and heated without modifying agent) are similarly referred to as candelilla controls A and B.

This series of furniture polish experiments showed some very interesting improvements as a result of the use of modifying agents, as compared with the several controls; and while adjustment of other ingredients in the formulation would normally be desirable, for properly balanced polishes when one wax is substituted for another, the formulation was kept the same throughout the series of experiments in order to clearly demonstrate the effect of substitution of the modified wax for the unmodified wax.

Various characteristics of the polishes were then determined and compared. The following are some of the more important improvements which were noted.

First, with respect to the beeswax furniture polishes, many of them indicated an improvement both with respect to rubbing qualities and with respect to stability (stability of the emulsion).

Thus, polishes prepared with waxes treated with sodium bisulphite, sodium hydrosulphite, benzidine base, nitroanthraquinone, all disclosed improved rubbing qualities, as compared with both of the beeswax controls A and B.

The stability of the polishes prepared with modified beeswax also compared very favorably with the beeswax controls, most of the polishes showing up better in this respect than the beeswax control A, many also being equivalent to beeswax control B.

The gloss of the modified beeswax polishes also compares favorably with the controls, beeswax treated with 5% sodium bisulphite, being markedly better than both of the controls A and B.

With respect to the use of candelilla wax, it is noted that various of the polishes containing modified candelilla wax showed improvement in rubbing qualities and stability of the emulsion as compared with candelilla controls A and B. The metal salts showed particularly good results with respect to rubbing qualities and stability, especially sodium bisulphite and sodium hydrosulphite.

Although there was considerable variation in color as between the various polishes, it may be mentioned that o-nitrophenol and sulphosalicylic acid, both with beeswax and with candelilla wax yielded polishes of quite light color.

Floor polish

The following formula was selected for purposes of testing the several waxes in a floor polish (all parts being by weight):

```
A. "Replacement ingredient" _____ 13.2 ⎫
   Oleic acid _____  1.5 ⎪
   Triethanolamine _____  2.2 ⎬ 100.9
   Borax _____  1.0 ⎪
   Water _____ 83.0 ⎭

B. Borax _____  2.1 ⎫
   Water _____ 14.2 ⎪
   Shellac _____  7.2 ⎬ 18.5
   Water _____ 24.2 ⎭
```

In formulating the foregoing polish, portion A is prepared by first melting the "replacement ingredient," i. e., the wax, and then adding the oleic acid. The temperature is brought to 95° C. and the triethanolamine is slowly added, with constant stirring. Next the borax of part A was dissolved in one-quarter of the water (heated to boiling), and this borax solution was then added to the wax solution. The resulting mass was stirred for two minutes, after which the remainder of the water (of part A) was added and the mixture stirred until cold.

Part B was prepared by boiling the first part of the water thereof and then dissolving the borax therein, after which the shellac was added to the borax solution with stirring. Finally the remainder of the water (boiling) was added.

Preferably after permitting the solutions (A and B) to stand for a day, 18.5 parts of B are added to 100.9 parts of A, with stirring.

As in the experiments with furniture polish, various of the modified and unmodified waxes were substituted in the position of the "replacement ingredient," and the polishes were then analyzed for various characteristics, for purposes of comparison.

Here again, notwithstanding the fact that for properly balanced polishes when one wax is substituted for another the formulation would ordinarily be altered, in order to secure better comparisons, the formula was kept the same in each instance, thereby clearly demonstrating the effect of substitution of the modified waxes for the unmodified waxes.

Numerous of the floor polishes made with modified waxes showed improvements over polishes made with the beeswax and candelilla wax controls A and B.

With respect to ease of emulsification, it is first noted that most of the modified beeswaxes were at least equal to or better than the beeswax controls A and B. Moreover, certain of the modifying agents yielded polishes in which the emulsion stability was at least equal to or better than the controls. Sodium bisulphite and sulphosalicylic acid were both effective in yielding good stability characteristics.

With respect to the properties just mentioned, the polishes made with modified candelilla wax also showed up in a similar way. Sulphosalicylic acid showed good results not only from the standpoint of ease of emulsion and stability of emulsion, but also with respect to polish or gloss secured. This reagent (sulphosalicylic acid) was in fact particularly good with respect to gloss.

Shoe polish

The shoe polish formula employed for test purposes was as follows (all parts being by weight):

```
"Replacement ingredient" _____  8
Beeswax _____  8
Montan _____  5
Paraffin _____ 15
Turpentine _____ 63
```

In preparing the shoe polishes, the "replacement ingredient" (the wax) was first melted after which the montan, beeswax and paraffin were added. Then, with agitation the turpentine was added. Here again, both the beeswax and candelilla controls A and B, as well as the modified waxes, were substituted in the position of the replacement ingredient.

The results with the beeswax polishes indicated that almost all of the polishes made with modified beeswax were at least harder than beeswax control A, and in some instances, even appreciably harder than beeswax control B.

With respect to gloss, improvement was noted with most of the polishes made with modified beeswax; sodium bisulphite, sodium hydrosulphite and p-toluene sulphochloride yielding polishes of particularly good gloss in comparison with the controls.

With respect to polish consistency, it is worthy of note that in general the waxes treated with ½% of the modifying agents yielded harder polishes than those with 5% of modifying agent. However, the metal salts showed up well with respect to consistency, even where used in 5% concentration; 5% sodium bisulphite and 5% sodium hydrosulphite both yielding quite hard polishes in comparison with the beeswax controls A and B.

Many of the polishes made with modified candelilla wax also showed up satisfactorily with respect to consistency and gloss, sodium bisulphite being particularly good for both of these characteristics. p-Toluene sulphochloride also yielded notably improved viscosity (a harder paste) than did the candelilla controls A and B.

I claim:

1. The process of modifying at least one of the following physical properties of ester-type waxes: consistency, melting point, rubbing characteristics, which process comprises dispersing in the wax from 0.5% to 10% of a compound having within the molecule an acidic inorganic residue and an organic residue and heating the wax to a temperature between about 100° C. and the decomposition point of the wax, until the wax manifests properties which are substantially different in at least one of the respects herein named, as compared to the properties of a similar material subjected to the same treatment but in absence of the treating compound, said treating compound being a member of the class consisting of aromatic sulfonic acids, aromatic sulfochlorides, and nitro-substituted aromatic compounds, capable of yielding an inorganic acid which is a member of the group consisting of sulfuric acid, chlorsulfonic acid and nitric acid under the conditions of the treatment.

2. The process in accordance with claim 1 in which the treatment temperature is from about 250° C. to 310° C.

3. The process which comprises dispersing from 0.5% to 10% of a compound in an ester-type wax and heating the wax and treating compound to a temperature between about 100° C. and the decomposition point of the wax for at least 30 minutes to modify the solubility of the wax in organic solvents, which process is characterized in that the treating compound employed comprises an acidic inorganic residue and an organic residue, said inorganic residue being capable of yielding an inorganic acid upon the addition of at least one of the group consisting of hydrogen atoms, OH-groups, and water molecules, said modifying agent being a member of the class consisting of aromatic sulfonic acids, aromatic sulfochlorides, and nitro-substituted aromatic compounds, capable of yielding an inorganic acid which is a member of the group consisting of sulfuric acid, chlorsulfonic acid and nitric acid.

4. The process of claim 1, in which said wax is beeswax.

5. A process in accordance with claim 1 in which said wax is candelilla wax.

6. A process in accordance with claim 1 wherein the treatment temperature is from 250° C. to 310° C.

7. A polish comprising a modified wax product and a volatile dispersion medium and being characterized by a materially greater film toughness than characterizes a polish film made from the same ingredients but in which the wax is modified, said modified wax product comprising the reaction product of a natural ester-type wax with from 0.5% to 10% of a compound having within the molecule an acidic inorganic residue and an organic residue, and said compound being a member of the class consisting of aromatic sulfonic acids, aromatic sulfochlorides, and nitro-substituted aromatic compounds.

8. A heat-treated ester-type natural wax having dispersed therein from 0.5% to 10% of a treating compound having within the molecule an acidic inorganic residue and an organic residue, said wax having a melting point appreciably higher than that of the same natural wax heat-treated alone, and said treating compound being a member of the class consisting of aromatic sulfonic acids, aromatic sulfochlorides, and nitro-substituted aromatic compounds.

9. A polish comprising, as wax ingredient, the modified wax product of claim 8, and manifesting an increased hardness in its final films, as compared to a polish made in the same way and from the same ingredients but in which the wax component does not comprise a treating compound, said polish also containing water as volatile dispersion medium.

10. A polish comprising, as wax ingredient the modified wax product of claim 8, and manifesting an increased hardness in its final films, as compared to a polish made in the same way and from the same ingredients but in which the wax component does not comprise a treating compound, said polish also containing an organic solvent as volatile dispersion medium.

LASZLO AUER.